Dec. 26, 1939.　　　　E. H. SMYTHE　　　　2,184,853

REFERENCE CARD AND MOUNTING THEREFOR

Filed Oct. 22, 1937　　　　6 Sheets-Sheet 1

INVENTOR
EDWIN H. SMYTHE
BY John S. Roberts
ATTORNEY

Dec. 26, 1939.   E. H. SMYTHE   2,184,853
REFERENCE CARD AND MOUNTING THEREFOR
Filed Oct. 22, 1937   6 Sheets-Sheet 2

INVENTOR
EDWIN H. SMYTHE
BY John G. Roberts
ATTORNEY

Dec. 26, 1939.   E. H. SMYTHE   2,184,853
REFERENCE CARD AND MOUNTING THEREFOR
Filed Oct. 22, 1937   6 Sheets-Sheet 3

INVENTOR
EDWIN H. SMYTHE
BY John G. Roberts
ATTORNEY

Dec. 26, 1939.   E. H. SMYTHE   2,184,853
REFERENCE CARD AND MOUNTING THEREFOR
Filed Oct. 22, 1937   6 Sheets-Sheet 4

INVENTOR
EDWIN H. SMYTHE
BY
ATTORNEY

Dec. 26, 1939.  E. H. SMYTHE  2,184,853

REFERENCE CARD AND MOUNTING THEREFOR

Filed Oct. 22, 1937  6 Sheets-Sheet 5

INVENTOR
EDWIN H. SMYTHE
BY John G. Roberts
ATTORNEY

Dec. 26, 1939.                 E. H. SMYTHE                  2,184,853
                  REFERENCE CARD AND MOUNTING THEREFOR
                  Filed Oct. 22, 1937        6 Sheets-Sheet 6

INVENTOR
EDWIN H. SMYTHE
BY John G. Roberts
ATTORNEY

Patented Dec. 26, 1939

2,184,853

UNITED STATES PATENT OFFICE 2,184,853

REFERENCE CARD AND MOUNTING THEREFOR

Edwin H. Smythe, Evanston, Ill.

Application October 22, 1937, Serial No. 170,340

17 Claims. (Cl. 129—16)

This invention relates to reference cards and mountings therefor, such cards and mountings being generally of the type that form the subject matter of my Patent No. 1,997,320 issued April 9, 1935.

The primary object of the invention is to produce a card adapted automatically to restore itself to its normal position when displaced therefrom, in other words, a self-restoring card.

Generally, this object is accomplished by flexibly hinging the card to a base portion along a curved hinge line. The curvature of the hinge line may lie in the general plane of the card, or the curvature may be transverse to the general plane of the card, or both curvatures may be combined in the same hinge line.

When the hinge line is in the plane of the card, the curvature may be upon the arc of a circle the center of which is in the direction of the top of the card. That is, the ends of the hinge line at the side edges of the card are closer to the top of the card than the center of the hinge line. With this curvature, the displacement of the top of the card in a direction transverse to the plane of the card distorts the free ends of the base portion to which the card is hinged in the direction of that displacement, so that, upon release of the top of the card from the displaced position, the ends of the base portion in returning to their normal position move in the opposite direction to that in which the top of the card has been displaced. This permits each card, when a number are assembled together, to resume its normal position, when released, without the movement of the free ends of the base portion that causes the restoration being impeded by the ends of the base portions of the cards which are still unreleased. That is, the free ends of the base portion of the released card in restoring move away from the free ends of the base portions of the cards which are still unreleased.

Again the curvature of the hinge line may be in a direction transverse to the general plane of the card. In such a case, the hinge line may extend in a straight line across the card, and the curvature of the line may be produced by a normal transverse curvature of the plane of the card and the attached base portion. In this case, when the top of the card is displaced, it should be displaced in a direction toward the convex side of the curvature. The result of such displacement, where a number of cards are assembled together, is to draw the free ends of all of the base portions in the direction of displacement. Then, upon the release of each card, the free ends of the base portion of that card tend to move away from the ends of the base portions of the unreleased cards, the movement of the ends of the base portion of the released card therefore being unimpeded.

The curvature of the hinge line in the general plane of the card is preferable to a curvature of the hinge line transverse to the general plane of the card for the reason that in the latter case the full extent of distortion of the card and the base as a result of the turning movement occurs at the outset of the turning movement and in a small portion of the total angle of rotation about the hinge line. Therefore, in such a case very little restoring force is exercised until the elements of the card have moved back nearly to their normal relationship. In the case in which the curvature of the hinge line is in the general plane of the card, the distortion as between the main portion of the card and its base portion is distributed over the whole turning movement, and is, therefore, effective to produce a restoring force during every part of the return movement of the card back to normal position. However, as has been stated, both curvatures may advantageously be combined in the same card.

The radius of curvature of the hinge line is a factor in determining the magnitude of the restoring force tending to return the card to its normal position. With a shorter radius and greater curvature, the distortion of the two portions of the card when turned with relation to each other is greater, and therefore a greater restoring force is built up. Conversely, with a greater radius, the relative distortion upon displacement of one portion of the card with respect to the other is less and the restoring force also is less. The magnitude of the restoring force may therefore be controlled by controlling the radius of curvature of the hinge line.

The restoring force, which is built up by turning the display portion of the card with respect to the base portion, is primarily dependent upon the resilient stiffness of the base portion of the card or of the display portion, or of both, as it is the translation of the turning movement into a flexural distortion of the base and display portions that builds up the restoring force. The elastic stiffness which produces the restoring force may be inherent in one or both elements of the card, or it may be produced by treatment of one or both elements with stiffening material, or it may be due to the application of a stiffening member to either one or both of the elements of the card when their inherent or treated stiffness is insufficient for the production of the desired result.

Where an elastic stiffening member is used, the member may be attached to and made integral with one or the other or both elements of the card, or it may be separate from the base portion but so located as to be in operative relation therewith.

Certain sorts of card stock may have sufficient resilient stiffness so that an adequate magnitude of restoring force is inherent in the material itself. Where it is undesirable for any reason to use this especially resilient stock, the stiffness may be imparted to it by impregnating it with a suitable stiffening material. It may be sufficient to impregnate only the base portion of the card. Where this method of imparting resilient stiffness is undesirable, the desired resilient stiffness may be obtained by gluing or cementing or otherwise securing, either to the base portion or to the display portion immediately adjacent to the hinge line, or to both portions, a transversely extending strip of elastic material. This material may be the same as that in the card itself, the mere gluing or cementing of a superposed strip being sufficient to impart a considerable amount of transverse resiliency. One of the simplest ways of obtaining the necessary resilient stiffness is to fold the lower portion of the base portion upwardly upon itself and cement or glue together the proximate surfaces of the folded portion and the base. Another method is to permanently secure a light transversely extending strip of spring metal to the card material immediately above or below the curved hinge line.

Where the material of the card does not have the requisite degree of resilient stiffness, and it is not desired to treat or reenforce the card itself along the hinge line, it is possible to obtain the proper restoring force by other means. One way is to associate with the card mounting, preferably with separators which intervene between the bases of the cards, transversely extending leaf springs of light spring metal, the ends of the springs being arranged to press against the free portions of each of the associated card bases. The card separators themselves may be made in such a way that they are provided with transversely projecting arms having the necessary resiliency.

The hinge between the display portion and the base portion of the card may be an integral portion of the card itself, or it may be of flexible material which is attached in a suitable manner, for example by cementing or gluing to the base and display portions of the card. In the latter case the display portion, the flexible hinge member, and the base portion may all be of different material, each adapted to have the particular properties which are best adapted to give the proper result in the combination.

It has been found that one of the cheapest and simplest constructions is to let the hinge between the two portions of the card be formed of the bridging elements or necks which result from punching a curved series of spaced perforations in a sheet of paper stock, the larger portion of the sheet being on the concave side of the curved series and constituting the display portion, and the part on the convex side of the series of perforations constituting the base portion. The flexibility of the hinge thus constituted is increased and the hinge line is defined by scoring the bridging elements or necks along the curved line of perforations, the scoring extending across the whole of each element from one perforation to the next. This arrangement has been found to make a very flexible hinge and one which will stand thousands of flexures without breaking the tongues.

When a number of the self-restoring cards are assembled together for the purpose of forming a card index or other similar device it is desirable that the cards be slightly spaced apart in order that, when the display portions are displaced their tops will overlap so that the release of the cards may conveniently be effected one at a time. The cards are therefore preferably provided with spacing separators, or separator portions, either integral with or detachable from the card bases. The cards may then be mounted in a suitable tray, cabinet or container to form an index unit in which the data entered on the proximate display portions of the individual cards will be rapidly and successively brought into view by running a finger over the tops of the cards to displace and successively release them.

The specific features and forms of the invention will be more fully explained in the following description, reference being had to the accompanying drawings wherein certain preferred forms of the invention are shown. It is to be understood, however, that the description and drawings are illustrative only and are not to be taken as limiting the invention except in so far as it is limited by the claims.

The embodiment of the invention illustrated in Figs. 1 to 10, inclusive, will first be described. The reference card 30 comprises a top or display portion 31 and a base portion 32 partially separated by a curved line of perforations 33, the necks or bridging portions 34 lying between the perforations constituting a flexible hinged connection between the base and display portions of the card. To increase the flexibility of the hinged connection the necks 34 are scored upon the same curved arc on which the perforations are formed. The two central perforations of the series are made larger and of a different shape for a purpose which will be referred to later. A strip 35 of thin resilient material is applied to the base portion 32 of the card to augment the transverse flexural rigidity of the base. The strip 35 may be a thin strip of metal folded over and clamped or crimped firmly upon the base 32 to form a relatively stiff metal binding, the upper edge of which lies just below the curved hinge line of the perforations 33.

Figures 1, 2, 2A, 3, 4, 4A, 11, 12:
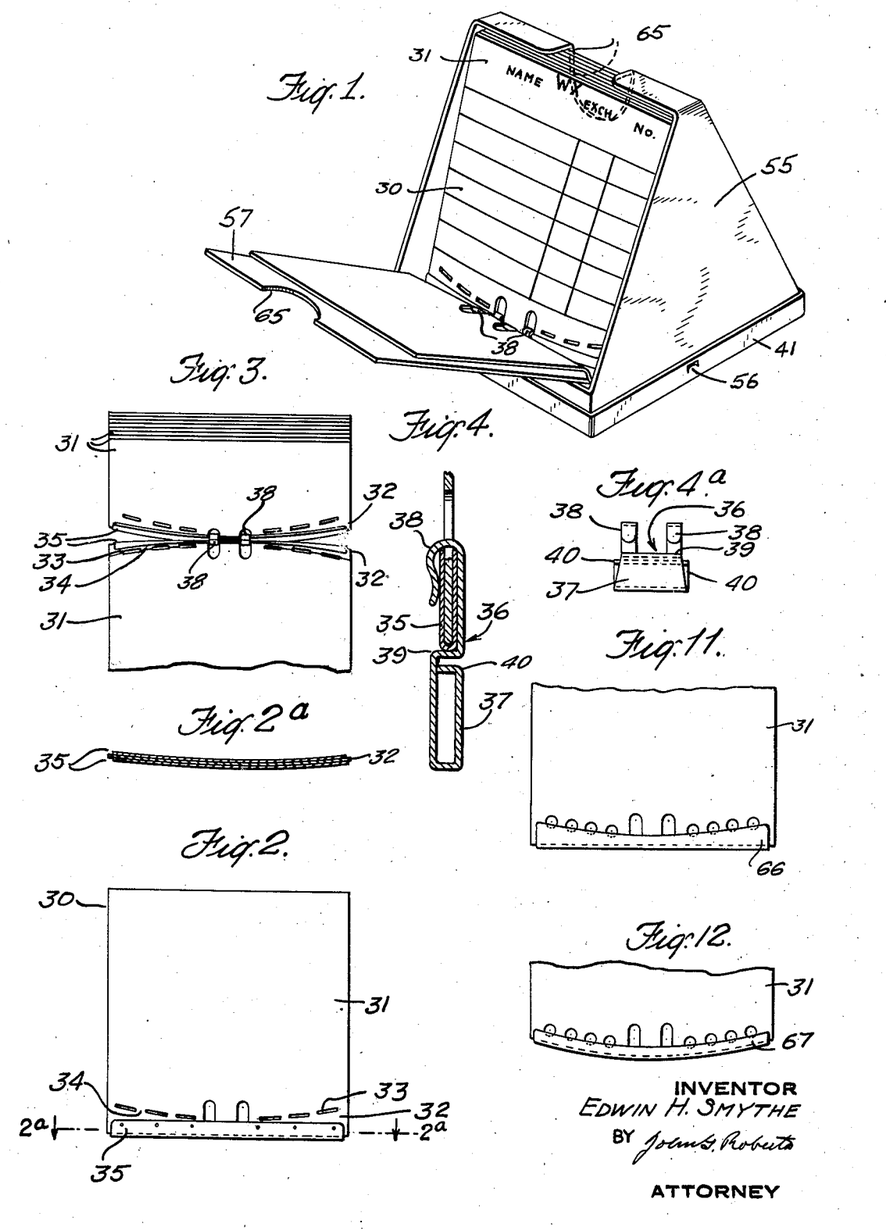
Fig. 1 is a perspective view of a reference card cabinet or container including a number of cards embodying the present invention.
Fig. 2 is a front view of one form of self-restoring card.
Fig. 2a is a sectional view on the line 2a—2a of Fig. 2.
Fig. 3 is a plan view of a series of the cards illustrating the action which takes place when one of the cards is turned out of its normal position.
Fig. 4 is an enlarged sectional view through the base portion of a card and its associated spacer.
Fig. 4a is a front view of the spacer.
Fig. 11 is a fragmentary front view of a self-restoring card with a modified form of binding strip.
Fig. 12 is a fragmentary view of a self-restoring card with another modified form of binding strip.

Preferably the binding strip 35 is applied to the base 32 under conditions such as to give the base and the general plane of the card 30 a slight transverse curvature, as shown in Fig. 2a. This tends to cause the base and display portions of the card normally to be maintained in the same plane. If now the base 32 is held at its middle and the top of the display portion 31 of the card is drawn forward in the direction of the convexity of the card plane, the turning movement of the display portion 31 about the curved hinge line along the necks 34 is translated into a flexural distortion of both base and display portions of the card. This distortion is such as to cause the free ends of the base portion to be drawn forward in the direction in which the top of the display portion is turned, thus flexing the base and its spring metal strip 35 as shown in Fig. 3; and when the top of the card is released the flexural force thus built up causes the restoration of the display portion back to its normal position, the free ends of the base also moving backward.

Material and dimensions which have given satisfactory results in the production of various sized cards such as that described above, are in one instance as follows: Ten mil card stock is used with the grain running vertically, or transverse to the hinge line. The curvature of the hinge line in the plane of the card is on a thirteen inch radius. The binding strip 35 is four mil cold rolled sheet steel and the transverse curvature of the strip is on a six inch radius more or less, depending on the magnitude of the restoring force it is desired to build up. The above details are merely illustrative, as wide variations in form, dimensions and material may be made without interfering with the satisfactory operation of cards of the sort described. Card stock of ordinarily good quality permits thousands of turning movements of the display portion of the card on its curved hinge line without the breaking of any part of the hinge.

Self-restoring cards of the type disclosed herein are particularly designed for use in card index or reference systems wherein a plurality of such cards are mounted in close association with each other in a suitable tray or container. When so used it is desirable that the cards shall be slightly spaced apart to facilitate the releasing of the cards one at a time when the tops of the stack have been drawn forward. The overlap of the tops of successive cards when drawn forward through an angle of about 90° is approximately equal to the normal spacing separation between the cards. To ensure the desired degree of overlap, spacing means is associated with the base of each card. This means may be an integral part of the base. In the form of the invention now being described, however, it is a separate element or spacer 36, as illustrated in Figs. 4 and 4a. This element acts not only as a spacer, but also cooperates in retaining its associated card in position in its container or tray, as will be described.

In the form illustrated, the spacer consists of a folded blank of sheet metal the lower portion of which, 37, performs the spacing function and the upper portion of which, including the two hooks 38, is adapted to engage and hold the base 32 of the card. The hooks 38 are designed and spaced to enter the two larger central perforations of the curved line of perforations 33, the recurved ends of the hooks being drawn over the upper edge of the binding strip 35 and moved down until the binding strip snaps into position. In this position the binding strip 35 lies between the lower ledge 39 of the spacer and the upper inside surfaces of the hooks 38, being held against the face of the recess thus constituted by the resiliency of the recurved portions of the hooks 38.

Separation of the card and spacer is accomplished by twisting the lower edge of the binding strip 35 forward sufficiently to permit it to slide down over the lower ledge 39. With the spacer detached the card may be placed in a typewriter for the reception of desired data.

The lower portion 37 of the spacer is formed with a thickness, or separation between its front and rear walls, equal to the desired spacing of the consecutive cards. In the present instance a spacing of one-sixteenth of an inch is used. But it may be greater or less, as desired. The planes of the front and rear surfaces of the lower portion 37 are parallel. If it should be desired that the tops of the cards in the stack converge, this may be accomplished by a corresponding angular convergence toward the top in the surfaces of the lower portion 37 of the spacers.

As mentioned above, the spacer 36 also cooperates in holding the associated card in position in its container or tray. This is effected through the medium of the shoulders 40 which project slightly beyond the side edges of the spacer at a point just below the ledge 39, in position to act as stops to prevent the lifting of a card and its attached spacer from the trough or channel upon which it is mounted, as will be described.

Self-restoring cards of the type to which this invention relates are susceptible of a wide variety of uses, especially such uses as require that the data entered on the cards shall be accessible instantly and with the minimum of effort on the part of the user. Telephone number indexes are of this sort, and the manner in which the self restoring cards that have been described are mounted and used as a telephone index is shown in the preferred form in Figs. 1 and 5 to 10, inclusive. The tray 41 of the container is formed in a single piece from sheet metal, preferably cold rolled steel. The parallel ribs 42 are struck up from the base to form a trough or channel for supporting the bases of the cards and receiving the spacers 36 which are attached to and depend from the card bases. The upper edges of the ribs 42 are turned inwardly toward each other to form narrow ledges 43 which, when the cards and spacers are assembled and mounted on the channel, overlie the shoulders 40 on the spacers and thus hold the cards in position. To mount a card and spacer on or withdraw it from the channel formed by the ribs 42, it is only necessary to turn the card slightly out of its normal plane transverse to the length of the channel. This swings the shoulders 40 of the spacer clear of the ledges 43 of the channel so that the movement of insertion or withdrawal is unobstructed.

Figures 5, 6, 7, 9, 10:
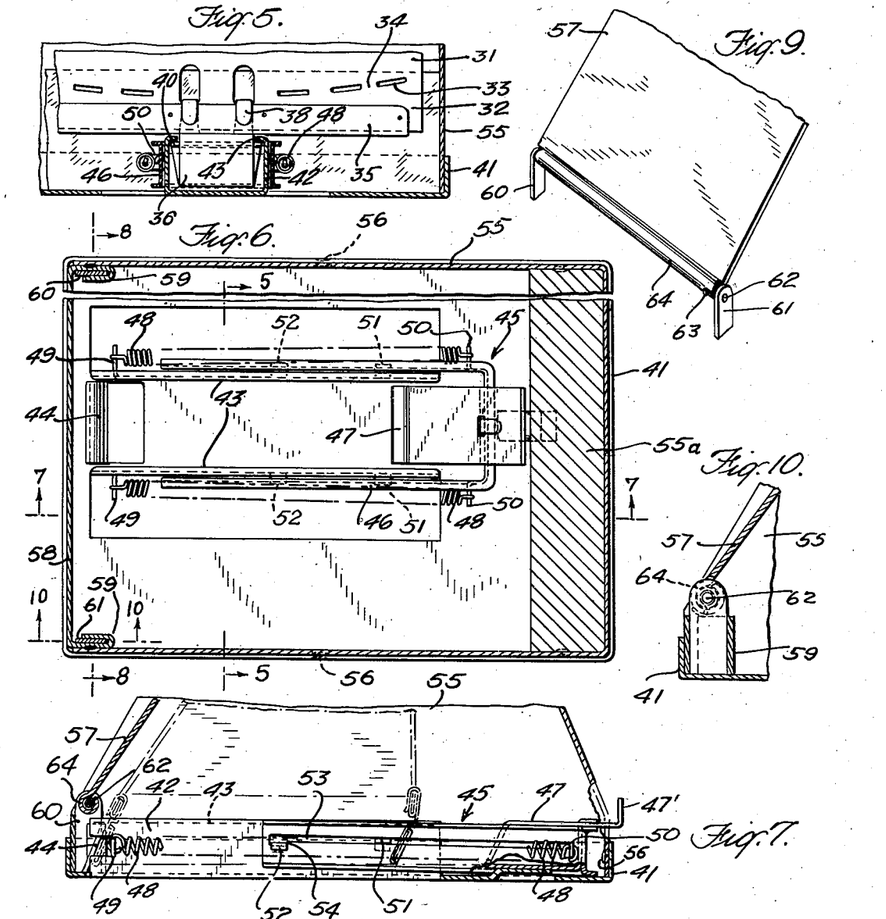
Fig. 5 is a fragmentary sectional view taken on the line 5—5 of Fig. 6.
Fig. 6 is a broken plan view partly in section of the base of the container shown in Fig. 1.
Fig. 7 is a fragmentary sectional view taken on the line 7—7 of Fig. 6.
Fig. 9 is a perspective view of the closure plate removed from the cabinet.
Fig. 10 is a fragmentary sectional view of the closure plate, taken transversely of its hinge.

The normal plane of the stack of cards 30 and spacers 36 transverse to the trough or channel is maintained by a front stop 44 struck up from the base of the tray 41, and a slidable member 45. The member 45 in the particular form illustrated, may comprise a channel 46 bent into a U shape, the legs of the U exteriorly embracing and sliding upon the ribs 42 that constitute the trough or channel, and the end of the U carrying a presser member 47 that enters the end of the channel and engages the rear-most spacer 36 of the stack. The slidable member 45 with its presser member 47 are resiliently retained in their forward position with respect to the channel by a pair of coiled extension springs 48, one associated and extending parallel with each leg of the U. The forward end of each of the springs is attached to a lug 49 struck out from the corresponding rib 42, and the rear end of each is attached to a lug 50 struck out from the corresponding leg of the slidable member. The rearward movement of the slidable member is effected manually through the medium of the upturned rear portion 47' of the presser member 47.

In its sliding movements upon the channel the member 45 is guided by lugs 51 and 52 struck out from each of the ribs 42, which lugs enter longitudinal guide slots 53 in the corresponding legs of the slidable member. The forward end of each of the guide slots 53 is enlarged to form a latching shoulder 54 which is tilted up to engage the lug 52 when the member 45 is drawn back, through the medium of the upturned portion 47', to the limit of its backward movement, the member pivoting slightly upon the rear lugs 51 of the ribs 42. Forward pressure upon the upturned portion 47' causes the member to pivot in the reverse direction and disengage the latching shoulders 54 from their lugs 52, whereupon the springs 48 draw the slidable member 45 forward to bring the presser 47 into holding engagement with the rear-most spacer 36 of the stack of cards. The ends of the lugs 52 are bent over to engage the outer surfaces of the legs of the sliding member 45 to keep them from spreading.

In the embodiment of the invention that is being described the container is provided with an enclosing shell 55 formed of sheet metal to fit within the upturned edges of the tray 41. Projections 56 embossed inwardly in the upturned edges of the tray coact with the corresponding square holes punched in the shell 55 to hold the tray and shell together. Inward pressure exerted upon the opposite side surfaces of the shell springs the sides in sufficiently to disengage them from the corresponding projections 56 of the tray, whereupon the front of the shell may be tilted up and the shell disengaged from the rear embossed projections 56.

Figure 8:
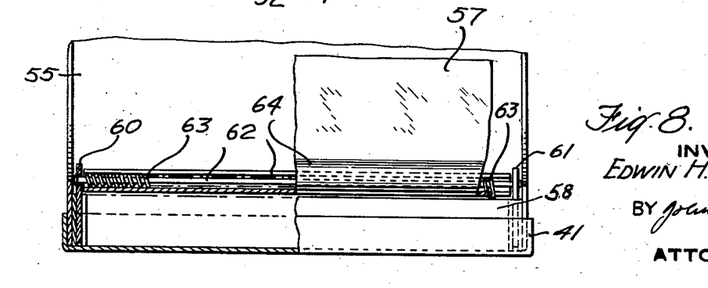
Fig. 8 is a front view partly in section showing the construction of a hinged closure plate in assembled position on the card cabinet.

The shell 55 is preferably wedge shaped in side elevation, as shown, the side and rear walls being formed in one piece and being in fixed relation to one another, and the upper part of the front wall or closure plate 57 being movable and hinged at its base. The lower portion of the front wall consists of a strip 58 secured, as by spot welding, to the open forward edges of the side walls of the shell 55, the ends of the strip 58 being bent to form sockets 59 in which end plates 60 and 61 of a pivot rod 62 are adapted to be seated. The pivot rod 62 is flattened at one end and is fixed in a corresponding rectangular aperture in end plate 60, while the other end of the pivot rod 62 is fulcrumed in a circular aperture in end plate 61. A long helical spring 63 loosely encircles the pivot rod 62, one end of the spring gripping the enlarged flattened end of pivot rod 62 and the other end being turned outwardly.

The lower end of the movable front wall or closure plate 57 is turned over to form a nearly closed tubular portion 64 into which the pivot rod 62 with its encircling helical spring 63 is inserted, the outwardly turned free end of the helical spring passing by way of the slot left by the partial closure of the tubular portion 64 to the opposite end of that portion where it is engaged in an end slot. By means of this arrangement one end of the helical spring 63 is fixed, through the flattened portion of the pivot rod, to the end plate 60 and the other end is fixed to the lower tubular portion of the closure plate 57. As there is a slight clearance between the exterior of the helical spring 63 and the interior of the tubular lower portion 64 of the closure plate 57, the closure plate is rotatable upon the pivot rod 62 and its helical spring 63. Therefore by rotating the end plate 60 to wind up the helical spring 63 to the desired degree of tension and then inserting the end plate 60 in the corresponding socket 59 of the lower front wall strip 58, the closure plate 57 is normally urged in a direction to close the front of the shell, but may be drawn forward against the spring tension to open the shell. The other end of the pivot rod 62 is fulcrumed to turn in the end plate 61 which is held in its corresponding socket 59 of the front strip 58. Both the rear wall of the shell 55 and the closure plate 57 are provided at the centers of their upper edges with semi-circular notches 65, for a purpose which will be referred to later.

When used as a telephone number index there may conveniently be as many of the self-restoring cards 30 provided as there are letters in the alphabet. Each of the cards may be vertically ruled, as shown, to provide separate columns for name of the subscriber, name of the exchange and telephone number, each card bearing at its top a different letter of the alphabet, and being ruled horizontally to provide separate horizontal lines for the entry of the data relating to the names of the telephone subscribers having this initial letter. To each of these cards is attached one of the spacers 36 in the manner already described. These cards are mounted in the tray 41 by removing the shell 55, drawing the sliding member 45 to the rear until it latches, as shown in Fig. 7, turning the cards and spacers at a slight angle to the transverse plane of the trough 42, dropping the spacers into position in the trough with their shoulders 40 underlying the narrow ledges 43 of the ribs 42, and then turning the cards and spacers into a plane transverse to the trough. The sliding member 45 is then released, as shown in Fig. 6, to cause its presser member 47 to engage the rearmost spacer of the stack and hold the spacers of the stack against the front stop 44 with the spacers and cards transverse to the longitudinal dimension of the trough. The stack of cards is so arranged that the letters at the tops of the cards are in alphabetical order with the first letter of the alphabet at the rear and the last letter at the front of the stack. The shell 55 is then mounted upon the tray 41, being held in position by the embossed projections 56.

A finger may now engage the top of the rear card of the stack by being inserted in the semicircular notch 65 at the top of the shell. All of the cards are now drawn forward to an angle of about 90° to the normal plane of the cards. When thus drawn forward the top of each card overlaps the top of the next adjacent card to the rear of it by a distance approximately equal to the thickness of the spacers 36. As the finger is drawn forward each of the self-restoring cards automatically returns to its normal position, thus displaying the entries that have been made upon it. As the card bearing the desired letter at its top is released and its entries come into view the movement of the finger is arrested until the entry is read. After this the withdrawal of the finger permits the complete stack to return to its normal position, the spring urged closure plate 57 being returned to close the shell within which the cards are mounted. If necessary the rear of the tray 41 or of the shell 55 may be suitably weighted, as shown at 55a in Fig. 6, to prevent any tendency for the container to be upset by the force exercised in turning forward the stack of cards.

If it is desired to remove any one of the cards to add to or change its entries, it is merely necessary to remove the shell 55 and draw back the sliding member 45 by means of the upturned portion 47' until the sliding member latches; then by turning all of the cards in their tray at an angle to their normal transverse plane of the trough, the desired card may be lifted out. The spacer 36 may then be detached from the card if the entry is to be made by means of a typewiter. After the entry is made the spacer may be reattached, the card dropped back into the trough, the sliding member 45 released to square the cards and hold them in the trough, and the shell 55 replaced.

If more space for entries is required than that available on the face of each alphabetical card, the backs of the cards may also be ruled into vertical columns and horizontal spaces exactly like those on the faces of the cards. When the index is open, in the manner described, to display the face of the desired one of the lettered cards, the ruled columns on the back of the card representing the next succeeding letter, line up with the columns on the card the face of which is displayed, and the horizontal spaces on the back of the succeeding card may be employed to supplement the entry spaces of the preceding card.

As has hereinbefore been indicated, cards having the property of automatically restoring the top or display portion of the card to normal position when it is displaced therefrom may be made in a variety of forms. The form illustrated in Fig. 11 differs from the previously described form illustrated in Fig. 2 only in the contour of the strip of resilient material 66 applied to the base of the card. This strip 66 is so shaped that when it is clamped upon the base, the upper edge of the strip follows the curved hinge line, and lies slightly below that line. The result is to apply the flexural restoring force of the strip somewhat more directly to the curved hinge than in the case of the form illustrated in Fig. 2.

This same object is accomplished in the modification illustrated in Fig. 12 by means of a binding strip 67 in which the lower as well as the upper edge of the strip as applied to the base of the card is curved to correspond with the curvature of the hinge line.

Figure 13:
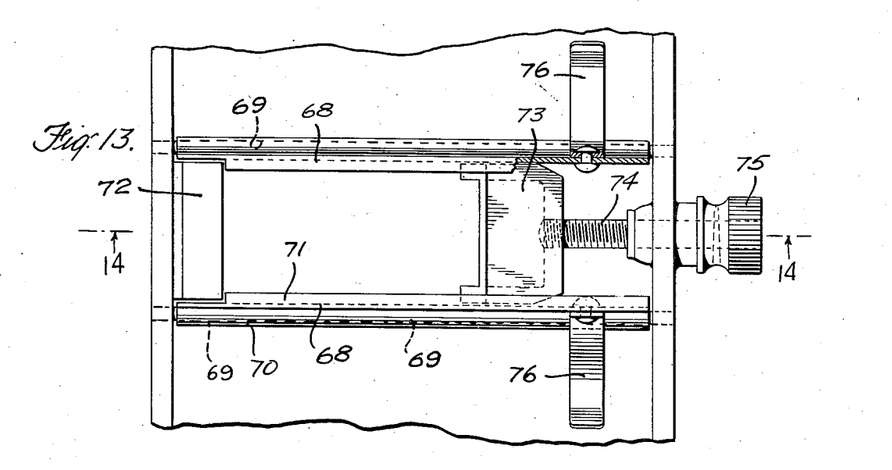
Fig. 13 is a fragmentary plan view partly in section of the base of a modified form of container.
Figure 14:
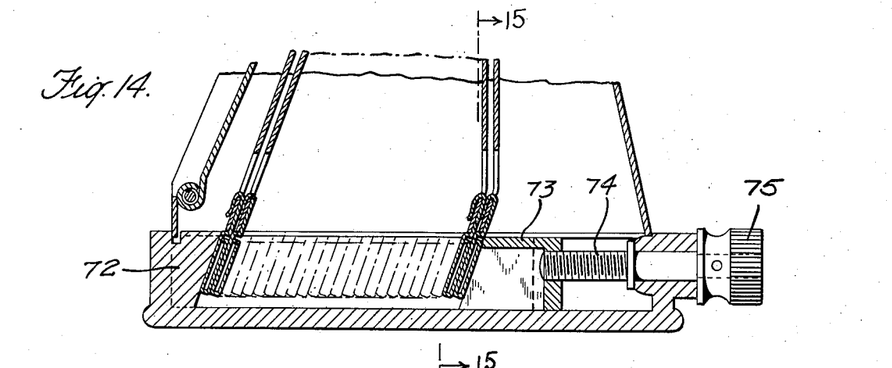
Fig. 14 is a sectional view taken on the line 14—14 of Fig. 13 showing cards mounted in the container.
Figure 15:
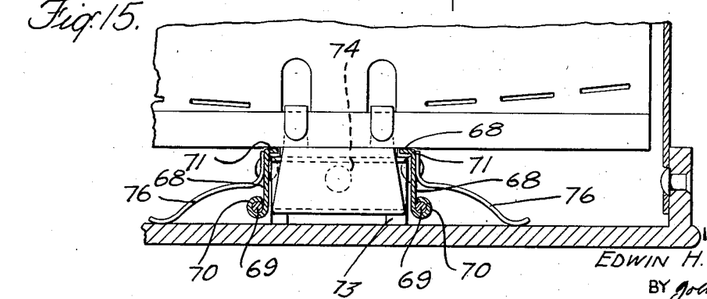
Fig. 15 is a fragmentary sectional view taken on the line 15—15 of Fig. 14.

A modified form of card index container adapted to use self-restoring index cards of the type hereinbefore described is illustrated in Figs. 13, 14 and 15. This modified form differs from the form of container previously described primarily in the construction of the trough or channel upon which the bases of the cards are mounted and into which the spacer elements depend, and in the slidable member that bears against the rear-most spacer of the stack of cards. As shown in Figs. 13 and 15, the channel is made up of a pair of swinging jaws 68 fulcrumed at their lower edges upon the pivot rods 69. The lower edge of each of the jaws 68 is bent to form a tube 70 which encircles and turns upon the corresponding pivot rod 69. The upper edges of the jaws 68 are turned inwardly toward each other to form narrow ledges 71 which, when the cards and spacers are mounted in position on the trough, overlie the shoulders 40 formed upon the sides of the spacers.

The foremost spacer of the stack, as shown most clearly in Fig. 14, is in engagement with a front stop 72, which is an integral part of the container. The rear-most spacer of the stack is engaged by a sliding block 73, as shown in Figs. 13 and 14. The sliding movement of the block 73 toward and away from the stack of spacers is effected by means of the adjusting screw 74, the outer end of which screw is journaled in an enlarged portion of the rear wall of the tray in such a manner that the screw is capable of rotational but incapable of longitudinal movement with respect to the portion of the rear wall of the tray through which it extends. The forward end of the screw 74 has screw threaded engagement with the sliding block 73, and the rear portion carries a knurled head 75. By rotating the knurled head 75 the sliding member or block 73 may be advanced into engagement with or withdrawn from the stack of spacers.

Each of the swinging jaws 68 has riveted to it a leaf spring 76 the free end of which bears against the inside surface of the tray, the leaf springs being under the tension such as to tend to swing their corresponding jaws 68 toward each other. The inward movement of the jaws is limited by the sides of the sliding block 73 against which the inner surfaces of the jaws below the ledges 71 bear. The beveled rear side edges of the sliding block 73 and the inner ends of the rivets that secure the leaf springs 76 to the jaws 68 constitute cams, so that as the sliding block 73 is withdrawn by the rotation of the knurled head 75, the jaws 68 are cammed apart to withdraw the ledges 71 at the upper edges of the jaws from their normal position overlying the shoulders formed upon the spacers. Thus the turning of the knurled head 75 withdraws the sliding block 73 from the stack of spacers and at the same time cams the jaws 68 apart to permit the cards with their attached spacers to be lifted out of the retaining trough.

In the self-restoring cards that have thus far been described the hinge line is curved in the general plane of the card. In the modification illustrated in Figs. 16 and 17 the hinge line 77 is straight with reference to the general plane of the card but is curved in the transverse plane of the card due to the fact that both the card and its base are curved in a transverse plane, as illustrated in Fig. 17. The hinge line 77 in this modification is established by a straight series of cuts or perforations across the card, the series of necks between the perforations being scored to facilitate the turning of the upper portion of the card with respect to its base. The curvature of the card at its base is obtained and the flexural rigidity of the base augmented by gluing or otherwise securing a strip of material 78 to the base while both the strip and the base are maintained curved as shown. The strip of material 78 may, if desired, be a downwardly extending portion of the base turned back upon itself.

After the card is formed, a turning of the upper portion in either direction with respect to the base portion is necessarily accompanied by a straightening out of the transverse curvature of both base and upper portions. When the upper portion is released both portions tend to spring back into their normal curved plane. In so doing they cause the portions to turn back into their original positions. By suitably mounting and spacing the mid-portions of the bases of a series of such cards the series is made automatically self-restoring. However, as stated in the prefatory portion of this specification, the greater part of the self-restoring force in this type of card is exercised in the final portion of the return movement of the upper part of the card, and for this reason a certain amount of curvature of the hinge line in the general plane of the card is desirable.

Figures 16, 22, 25, 26, 27, 28:
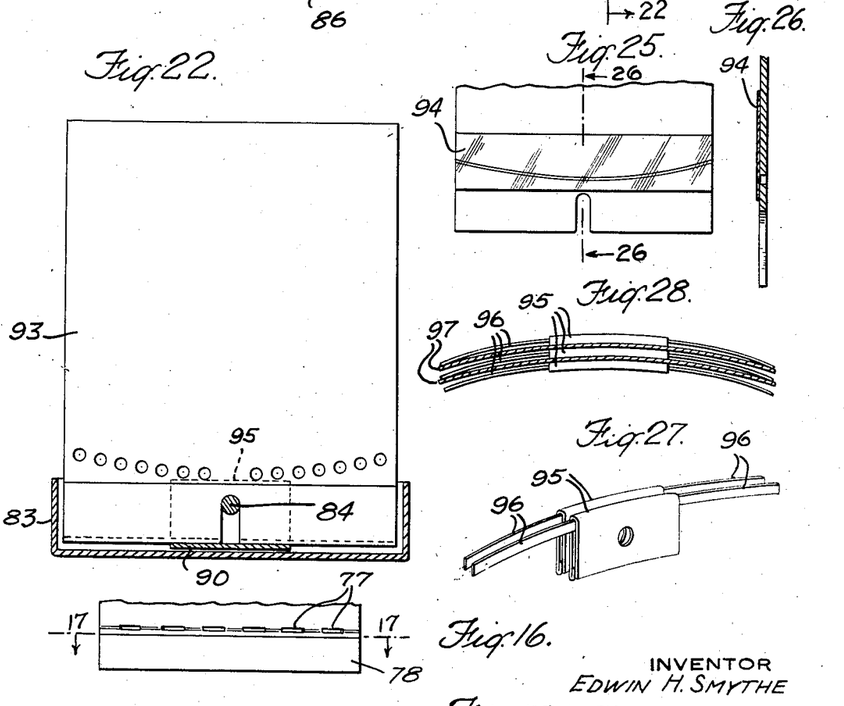
Fig. 16 is a front view of the lower portion of another modified form of self-restoring card.
Fig. 22 is a sectional view on the line 22—22 of Figs. 21 and 23.
Fig. 25 is a fragmentary front view of a card having a different type of flexible hinge construction.
Fig. 26 is an enlarged sectional view on the line 26—26 of Fig. 25.
Fig. 27 is a perspective view of spacer elements which may be used with a type of card that is not inherently self-restoring.
Fig. 28 is a plan view of a plurality of the separator elements shown in Fig. 27 with the bases of interposed cards shown in section.
Figure 17:
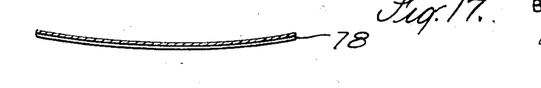
Fig. 17 is a sectional view on the line 17—17 of Fig. 16.
Figures 18, 19, 21, 24:
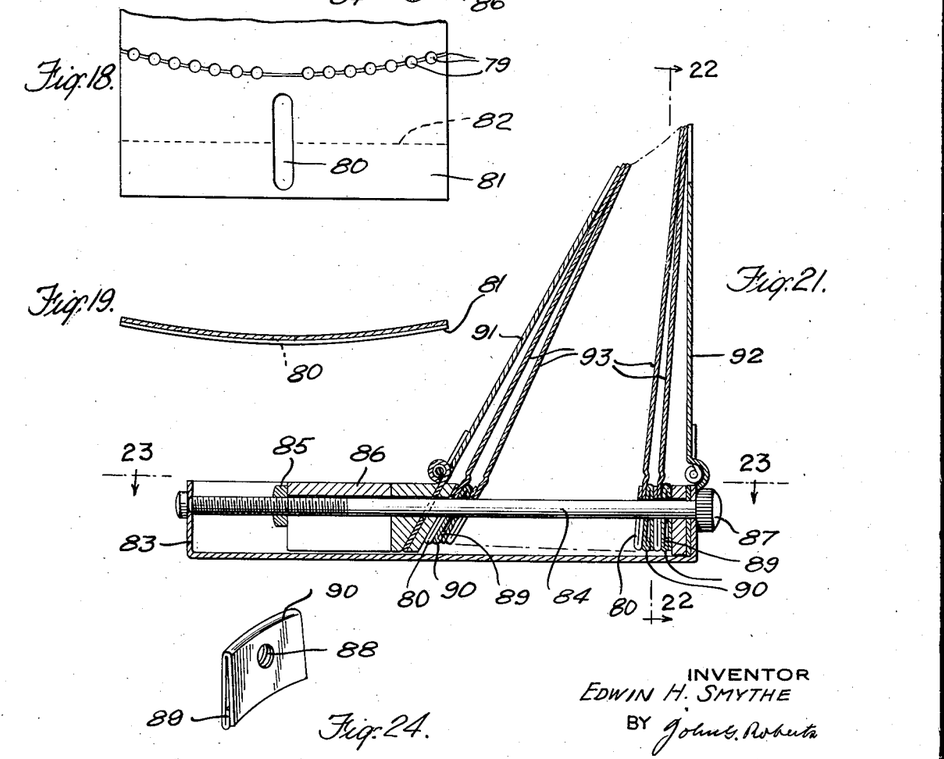
Fig. 18 is a plan view of the lower portion of another modification of self-restoring card showing how the card is formed from a single sheet of card stock.
Fig. 19 is a sectional view through the base of the form of card shown in Fig. 18 after the base has been formed.
Fig. 21 is a longitudinal sectional view through the tray as shown in Fig. 20.
Fig. 24 is a perspective view of a spacer or separator such as may be employed in the modified construction of Figs. 20 to 23, inclusive.

Such a combination of the two curvatures of the hinge line in a form of card in which the display portion, the base and the reinforcement of the base are formed from an integral piece of card stock is illustrated in the modification shown in Figs. 18 to 23, inclusive. In this modification the hinge line 79 is established by a curved series of perforations, in this case shown as circular, with the intervening necks of material scored to facilitate turning. The portion of the material that is to form the reinforced base is perforated with the elongated vertical slot 80. The lower part 81 of the base portion is folded back on the line 82 and is glued or otherwise fastened to the upper part of the base portion while the parts are maintained in a transversely curved plane, as illustrated in Fig. 19, the slot 80 when the parts are folded assuming the form of a slot with its lower end open, as shown in Fig. 22, for convenient assembly of the card upon a mounting rod.

A simple form of mounting for a plurality of such cards is illustrated in Figs. 20 to 23, inclusive. A tray 83 carries a rod 84 mounted in the end walls of the tray so as to be capable of rotational but incapable of longitudinal movement therein. The forward end of the rod 84 is screw threaded into a nut 85 secured to a sliding block 86 having a longitudinal bore through which the rod 84 passes loosely. The rear end of the rod 84 has fixedly attached to it a head 87 by means of which the rod may be turned to cause the block 86 to slide back and forth in the tray.

Upon the rear smooth portion of the rod 84 a plurality of spacers 90 are threaded. Each of these spacers may be of the form illustrated in Fig. 24, and each may consist of a piece of paper stock folded upon itself and of a thickness such as to provide the desired amount of spacing separation between the cards. Aligned holes 88 are provided in the folded halves of the separator through which the rod 84 is adapted to pass, with sufficient clearness between the rod and the inner edges of the holes so that the separators may be slightly tilted upon the rod. If it is desired that the tops of the mounted cards converge toward each other, the lower edge of one-half of the spacer may be turned back upon itself, as indicated at 89, to afford additional thickness at the bottom of the separator to cause the outer surfaces of the spacer to have the desired amount of angular convergence toward the top of the spacer. The spacer is also transversely curved to correspond with the transverse curvature of the cards 93 illustrated in Figs. 18 and 19.

Figure 20:
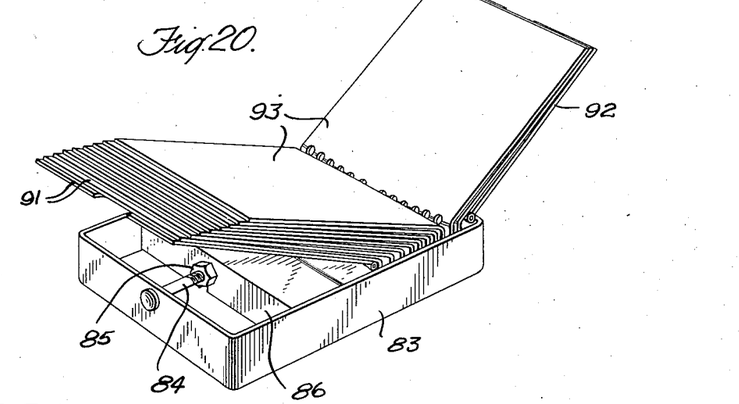
Fig. 20 is a perspective view of a tray and a series of mounted cards such as shown in Figs. 18 and 19.
Figure 23:
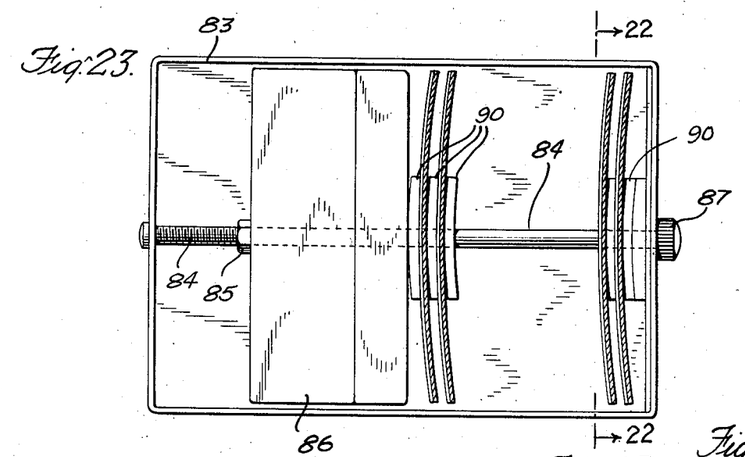
Fig. 23 is a sectional view on the line 23—23 of Fig. 21.
Figure 29:
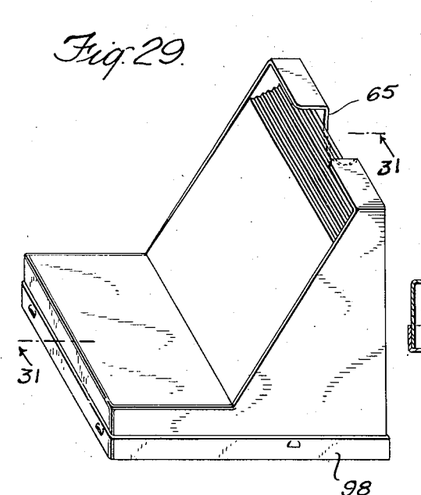
Fig. 29 is a perspective view of another form of card cabinet.
Figure 30:
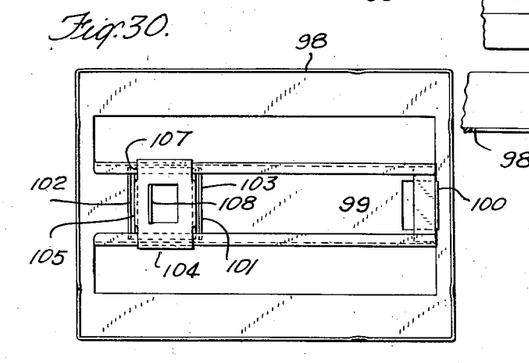
Fig. 30 is a plan view of the base of this form of cabinet.
Figure 31:
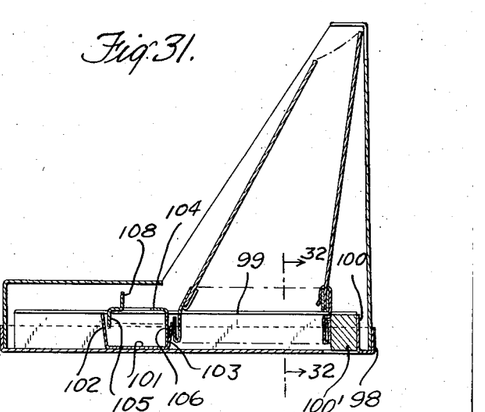
Fig. 31 is a sectional view taken on the plane 31—31 of Fig. 29.
Figure 32:
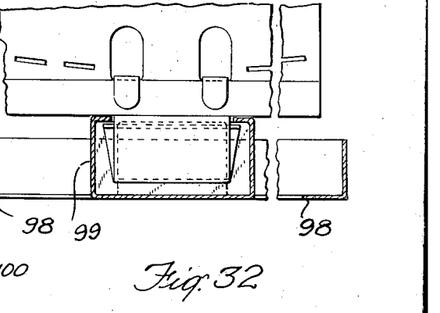
Fig. 32 is a fragmentary sectional view taken on the line 32—32 of Fig. 31.

A plurality of the spacers 90 thus formed are threaded upon the smooth rear portion of the rod 84. The cards are mounted in position by bringing the open ended slot in the center of the base of each card over the rod 84 and moving the cards downwardly between two spacers so that the rod 84 passes through the upper portion of the slot 80 with spacers 90 interposed between adjacent cards. This is done with the sliding block 86 moved forward in the tray. When the cards are assembled in position to form a stack of the desired number, the rod 84 is turned by means of the head 87 to move the sliding block 86 toward the rear of the tray and cause it to exercise pressure upon the stack to hold the cards in position. As shown, a hinged front plate 91 and a hinged back plate 92 may be provided, each of these plates being urged by suitable spring means to rotate toward the intervening stack of cards. The back plate 92 has a semi-circular finger notch in the middle of its upper edge. By inserting the finger in the notch the stack of cards may be swung forward and released one at a time to bring the card faces with the data entered thereon successively into view; and when the stack is released the self-restoring action of the cards returns the cards to their normal position, the spring urged front plate 91 also returning to enclose the stack between front plate 91 and back plate 92. The pivotal mounting of the back plate 92 makes it possible, when desired, to spread the cards more widely by pressing the rear cards of the opened stack backward, as illustrated in Fig. 20.

Figs. 25 and 26 illustrate a form of card in which the flexible hinge connection between the upper and base portions of the card is effected by forming the base and upper portions separately and connecting them by means of a thin strip 94 of tough flexible material, such as "cellophane," glued or cemented securely to the two portions.

Where the base and upper portions of the card have insufficient transverse flexural rigidity to bring about the automatic restoration of the upper or display portion of the card to its normal position when displaced therefrom, it is possible to supply the transverse flexural restoring force by means of an element separate from the card, and that is associated with the mounting means, as illustrated in Figs. 27 and 28. As shown the spacers 95, which may be similar to the spacer 90 illustrated in Fig. 24, carry transversely extending leaf springs 96 of spring metal or other suitable material which are adapted to bear against opposite ends of the bases 97 of the cards between which the spacers 95 are interposed, thus imparting to the bases of the cards the necessary transverse flexural rigidity.

Another form of card cabinet is illustrated in Figs. 29 to 33, inclusive. A tray 98 has a trough 99, open at its forward end and closed by a stop 100 struck up from the bottom of the tray at its rearward end. A block 100' may be inserted at the closed end to suitably position the most rearward card. The container to fit this tray has a rear upright part within which the cards lie and a front flat part over which they may be pulled. In this form the cards are held in place and released by means of a locking slide, shown enlarged in Fig. 33, which is slidable in the trough rearwardly against or forwardly away from the cards. The locking slide has a lower U shaped element 101 the forward arm 102 of which extends upwardly and forwardly at an angle somewhat more than 90° from the base, its upper edge being adapted to clutch or bear with locking resistance, with respect to forward movement, against the inwardly turned upper ledges of the trough. The other arm 103 may extend substantially vertically, or at a slightly obtuse angle, from the base toward but out of contact with the trough ledges, and is adapted to engage the most forward one of the stack of cards. Fitting partly within the element 101 and also overlapping and tracking the trough is the other element 104 of the locking slide. This element has two downwardly extending arms 105 and 106 which fit within the upturned arms of the element 101 and are slotted at their shoulders as shown at 107—107 to track the inwardly turned ledges of the trough. An operating lug 108 is upwardly struck from the top part of the member 104.

Figure 33:
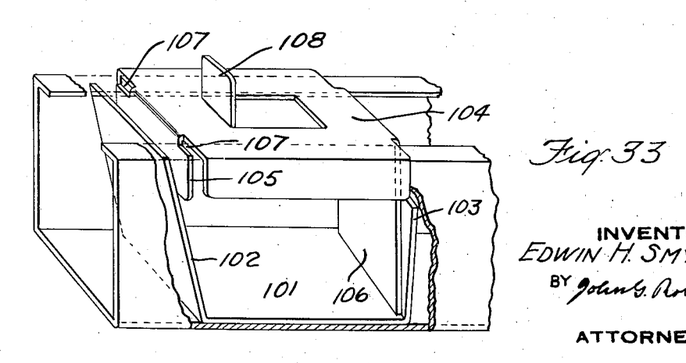
Fig. 33 is an enlarged detail view of a slidable pusher device with a fragmentary portion of the trough in which it operates.

The construction is such that the locking slide is movable at will by forces manually applied in either direction to the lug 108. When the locking slide has been moved rearwardly against the cards the upper edge of the forwardly inclined arm 102 of the U shaped element wedges against the underneath surfaces of the inturned ledges of the trough and thus locks the member against movement by the counter force of the cards. The cards are thus securely held in place. To release the locking slide from the cards it is only necessary to pull forwardly on the lug 108. This causes the arm 105 to engage the arm 102 and results in an unlocking displacement of the upper locking edge of that arm. The U-shaped member 101 is preferably so formed and related to the downwardly extending arm 106 of the member 104 that the locking edge of the forwardly inclined arm 102 is resiliently held in firm engagement with the overhanging ledges of the trough as the locking slide is moved rearwardly against the cards. Because of its angular position the locking arm 102 offers no substantial resistance to rearward movement.

Having thus described my invention, what I claim as new and desire to secure by Letters Patent is:

1. A self-restoring index card having a display portion and a base portion with a curved line of perforations forming a series of flexible necks connecting said display and base portions and forming a hinge therebetween.

2. A self-restoring index card having a display portion and a base portion resiliently hinged together along a curved line.

3. A self-restoring index card having a display portion and a base portion hinged together along a curved line, one of said portions having resilient stiffness along the line of said curved hinge.

4. A card having a display portion and a base portion flexibly connected together, said base portion having transverse resilient stiffness and normally having a transverse curvature, whereby the display portion of the card is restored to its normal position with respect to the base portion when displaced from its normal position and released.

5. A card having a display portion and a base portion flexibly connected together, and material associated with the base portion imparting thereto transverse resilient stiffness and giving the base portion a normal transverse curvature.

6. A card having a display portion and a base portion hinged together along a curved line the center of whose curvature lies in the plane of said card and in the direction of the top thereof.

7. A card having a display portion and a base portion hinged together along a curved line the center of whose curvature lies in the plane of said card and in the direction of the top of said display portion, one of said portions having resilient stiffness along said curved hinge line.

8. A card having a display portion and a base portion with a curved line of perforations forming a series of flexible necks connecting said display and base portions and forming a hinge therebetween, and means for imparting transverse resilient stiffness to one of said portions along said hinge.

9. A self-restoring card formed of resilient material and having a display portion and a base portion with a curved line of perforations forming a series of flexible necks connecting said portions and constituting a hinge therebetween, the center of curvature of said line of perforations lying in the direction of the top of said card.

10. A card having a display portion and a base portion hinged together on a curved line the center of whose curvature lies in the plane of the card and in the direction of the top thereof, and means for resiliently maintaining said portions normally in a transversely curved plane.

11. A card having a display portion and a base portion hinged together on a curved line the center of whose curvature lies in the plane of said card and in the direction of the top thereof, and means asociated with said base portion for resiliently maintaining said portions in a transversely curved plane, the convex side of said card being toward the front.

12. A card having a display portion and a base portion with an upwardly curved line of perforations forming a series of flexible necks connecting said display and base portions and forming a hinge therebetween, and a transverse spring member permanently secured to said base portion and lying along said hinge.

13. A card having a display portion and a base portion with an upwardly curved line of perforations forming a series of flexible necks connecting said display and base portions and forming a hinge therebetween, and a binding strip crimped over the lower edge of said base portion and constituting a transverse spring member for imparting resilient stiffness to said base portion along the line of said hinge.

14. A card having a display portion and a base portion hinged together along an upwardly curved line, and a transversely bowed spring member associated with said base portion.

15. A reference card including a display portion and a base portion flexibly connected together, a spring member associated with said base portion for restoring said display portion to its normal position with relation to the base when displaced therefrom, and a rigid spacing member for spacing said card with relation to other cards when assembled therewith, said spacing member being normally attached to the midpoint of and readily detachable from said spring member associated with the base of said card.

16. A card having a display portion and a base portion hinged together along an upwardly curved line, a metal strip secured to said base portion and constituting a transverse spring for restoring said display portion to its normal position when it is displaced therefrom, and a member for spacing said card with respect to other similar cards when assembled therewith, said member comprising a rigidly related lower spacing part and upper part the latter of which is detachably secured to the midpoint of said transverse spring strip of said card.

17. A reference card system including a plurality of cards each having a display portion and a base portion resiliently hinged together, a mounting tray for said cards, and a rigid spacing member for each card having a lower portion fixed in said mounting tray and an upper portion detachably secured to the mid-point of the base portion of each card for establishing a fixed spacing between said cards when they are mounted in said tray and holding the cards so as to permit free movement of the ends of said base portion.

EDWIN H. SMYTHE.